(12) United States Patent
Young et al.

(10) Patent No.: US 8,874,248 B2
(45) Date of Patent: Oct. 28, 2014

(54) IMAGE PROCESSING METHOD AND METHOD OF THREE-DIMENSIONAL PRINTING INCORPORATING THE SAME

(75) Inventors: Philippe Georges Young, Lympstone (GB); David Raymont, Okehampton (GB)

(73) Assignee: Simpleware Limited, Exeter, Devon (GB)

( * ) Notice: Subject to any disclaimer, the term of this patent is extended or adjusted under 35 U.S.C. 154(b) by 785 days.

(21) Appl. No.: 13/030,343

(22) Filed: Feb. 18, 2011

(65) Prior Publication Data

US 2011/0205583 A1 Aug. 25, 2011

(30) Foreign Application Priority Data

Feb. 23, 2010 (GB) .................................. 1003065.8

(51) Int. Cl.
| | | |
|---|---|---|
| *G06F 19/00* | (2011.01) | |
| *G06T 17/00* | (2006.01) | |
| *B29C 67/00* | (2006.01) | |
| *G06T 19/20* | (2011.01) | |
| *G06F 3/12* | (2006.01) | |

(52) U.S. Cl.
CPC ............... *G06T 17/00* (2013.01); *G06F 3/1219* (2013.01); *G06F 3/1244* (2013.01); *G06F 3/1208* (2013.01); *B29C 67/0088* (2013.01); *G06T 19/20* (2013.01)
USPC .............. 700/98; 345/419; 345/420; 707/741

(58) Field of Classification Search
USPC .......................................................... 700/98
See application file for complete search history.

(56) References Cited

U.S. PATENT DOCUMENTS

| 6,229,545 | B1 | 5/2001 | Satoh | |
|---|---|---|---|---|
| 6,421,048 | B1 * | 7/2002 | Shih et al. ..................... | 345/419 |
| 6,552,722 | B1 * | 4/2003 | Shih et al. ..................... | 345/419 |
| 6,720,963 | B2 * | 4/2004 | Yoshida et al. ............... | 345/420 |
| 6,792,398 | B1 * | 9/2004 | Handley et al. ................... | 703/2 |
| 6,831,640 | B2 * | 12/2004 | Shih et al. ..................... | 345/419 |
| 7,084,883 | B2 * | 8/2006 | Sasaki .......................... | 345/606 |
| 7,087,200 | B2 * | 8/2006 | Taboas et al. .................. | 264/49 |

(Continued)

FOREIGN PATENT DOCUMENTS

WO   WO 2010/039123   4/2010

OTHER PUBLICATIONS

Hiller, J., Lipson, H., (2009) "Design and analysis of digital materials for physical 3D voxel printing (http://ccsl.mae.cornell.edu/sites/default/files/RPJ09__Hiller.pdf)", Rapid Prototyping Journal, vol. 15, No. 2, pp. 137-149.*

(Continued)

*Primary Examiner* — Mohammad Ali
*Assistant Examiner* — Kelvin Booker
(74) *Attorney, Agent, or Firm* — Leason Ellis LLP (57) ABSTRACT

A method for preparing image data for three-dimensional printing in which a digitized (e.g. voxelized) representation of a virtual three-dimensional object (e.g. CAD model) is eroded to create an internal volume for the object. Subsequently, a vector-based surface representation of this internal volume is generated and simply combined with a corresponding vector-based surface representation of the original virtual three-dimensional object to yield a hollowed out model in a format suitable for three-dimensional printing.

A microstructure may be introduced into the interior of the hollowed out model, e.g. by extracting a volume corresponding to the inverse of that microstructure from the eroded digitized representation.

28 Claims, 5 Drawing Sheets

(56) References Cited

U.S. PATENT DOCUMENTS

| | | | |
|---|---|---|---|
| 7,102,635 B2* | 9/2006 | Shih et al. | 345/419 |
| 7,259,761 B2* | 8/2007 | Shih et al. | 345/419 |
| 7,762,814 B2* | 7/2010 | van der Zel | 433/201.1 |
| 7,815,826 B2* | 10/2010 | Serdy et al. | 264/49 |
| 7,864,173 B2* | 1/2011 | Handley et al. | 345/420 |
| 8,355,020 B1* | 1/2013 | Hanau et al. | 345/419 |
| 8,458,188 B2* | 6/2013 | Salemann | 707/741 |
| 8,576,222 B2* | 11/2013 | Handley et al. | 345/419 |
| 8,587,587 B2* | 11/2013 | Hanau et al. | 345/423 |
| 8,736,609 B2* | 5/2014 | Brabec | 345/426 |
| 2001/0033281 A1* | 10/2001 | Yoshida et al. | 345/420 |
| 2002/0005856 A1* | 1/2002 | Sasaki | 345/606 |
| 2003/0012419 A1* | 1/2003 | Accomazzi | 382/131 |
| 2003/0128208 A1* | 7/2003 | Shih et al. | 345/419 |
| 2004/0011231 A1* | 1/2004 | Hall et al. | 101/327 |
| 2004/0170311 A1* | 9/2004 | Accomazzi | 382/131 |
| 2005/0001831 A1* | 1/2005 | Shih et al. | 345/419 |
| 2005/0062738 A1* | 3/2005 | Handley et al. | 345/419 |
| 2007/0009606 A1* | 1/2007 | Serdy et al. | 424/497 |
| 2007/0018973 A1* | 1/2007 | Shih et al. | 345/419 |
| 2007/0057945 A1 | 3/2007 | Olson | |
| 2008/0032083 A1* | 2/2008 | Serdy et al. | 428/43 |
| 2008/0088620 A1* | 4/2008 | Shih et al. | 345/420 |
| 2008/0317317 A1* | 12/2008 | Shekhar et al. | 382/131 |
| 2009/0042167 A1* | 2/2009 | Van Der Zel | 433/215 |
| 2010/0027861 A1* | 2/2010 | Shekhar et al. | 382/131 |
| 2011/0033887 A1* | 2/2011 | Fang et al. | 435/41 |
| 2011/0076734 A1* | 3/2011 | Zhou et al. | 435/173.1 |
| 2011/0076762 A1* | 3/2011 | Serdy et al. | 435/325 |
| 2011/0102435 A1* | 5/2011 | Brabec | 345/424 |
| 2011/0123794 A1* | 5/2011 | Hiller et al. | 428/221 |
| 2011/0202538 A1* | 8/2011 | Salemann | 707/741 |
| 2012/0058174 A1* | 3/2012 | West et al. | 424/443 |
| 2012/0128739 A1* | 5/2012 | Nygaard et al. | 424/400 |
| 2012/0219698 A1* | 8/2012 | Steingart et al. | 427/2.29 |
| 2012/0330423 A1* | 12/2012 | Lin et al. | 623/17.16 |
| 2012/0330635 A1* | 12/2012 | Miga et al. | 703/11 |
| 2013/0063437 A1* | 3/2013 | Hanau et al. | 345/423 |

OTHER PUBLICATIONS

Hiller, J., Lipson, H. (2009) "Fully Recyclable Multi-Material Printing (../../sites/default/files/SFF09_Hiller3.pdf) " Solid Freeform Fabrication Symposium (SFF'09), Aug. 3-5, 2009, Austin, TX, USA.*

Hiller J., Lipson H., (2008) "Tunable Digital Material Properties for 3D Voxel Printers (http://w w w .mae.cornell.edu/ccsl/papers/SFF08_Hiller.pdf)", Proceedings of the 19th Solid Freeform Fabrication Symposium, Austin TX, Aug. 2008.*

Hiller J., Lipson H., (2007) "Methods of Parallel Voxel Manipulation for 3D Digital Printing (http://w w w .mae.cornell.edu/ccsl/papers/SFF07_Hiller.pdf)", Proceedings of the 18th Solid Freeform Fabrication Symposium, Austin TX, Aug. 2007, pp. 200-211.*

Hiller, J., "Rapid Assembly for Physical Voxel Fabrication (Digital Materials)", 2010, Cornell Creative Machines Lab, Retrieved from the Internet at "http://creativemachines.cornell.edu".*

Pasko, A.; Vilbrandt, T.; Fryazinov, O. and Adzhiev, V., "Modelling and Visualization of Microstructures", 2010, SV-Journal.com.*

Kaufman, A. and Shimony, E., "3D Scan-Conversion Algorithms for Voxel-Based Graphics", Oct. 1986, 1986 Workshop on Digital Graphics.*

Yagel, R.; Cohen, D. and Kaufman, A., "Normal Estimation in 3D Discrete Space", 1992, The Visual Computer, vol. 8, pp. 278-291.*

Chandru, V.; Manohar, S. and Prakash, C.E., "Voxel-Based Modeling for Layered Manufacturing", Nov. 1995, Rapid Prototyping Technology.*

Calvert, P., "Inkjet Printing for Materials and Devices", 2001, Chem. Mater, vol. 13, p. 3299-3305.*

Crostack, H.-A.; Nellesen, J.; Fischer, G; Schmauder, S.; Weber, U. and Beckmann, F., "Tomographic Analysis and FE-Simulations of MMC-Microstructures under Load", 2006, Proceedures of SPIE, vol. 6318.*

Wu, Y.T., "From CT Image to 3D Model, Thanks to New 3D Imaging Software, Surgeons Can Now Create Physical Models of their Patients' Inside", Aug. 2001, pp. 20-23.*

Gabbrielli, R., Turner, I.G., and Bowen, C. R. "Development of Modelling Methods for Materials to be Used as Bone Substitutes." Nov. 2007. Key Engineering Materials 361-363, 903-906, 2008.

* cited by examiner

IMAGE PROCESSING METHOD AND METHOD OF THREE-DIMENSIONAL PRINTING INCORPORATING THE SAME

This patent application claims the benefit of priority under 35 U.S.C. Section 119(e) from Great Britain Patent Application No. 1003065.8, filed on Feb. 23, 2010, now pending and entitled "Image Processing Method and Method of Three-Dimensional Printing Incorporating the Same", which is hereby incorporated by reference in its entirety.

FIELD OF THE INVENTION

The invention relates to the preparation of image data for three-dimensional printing, e.g. for use in the manufacture of three-dimensional models in rapid prototyping apparatus or the like, where a three-dimensional model is built by successive deposition of a plurality of layers, e.g. using selective laser sintering and selective laser melting.

BACKGROUND TO THE INVENTION

It is known to build physical three-dimensional models using additive manufacturing technology. Typically, a virtual design of the three-dimensional model, e.g. represented through computer-aided design (CAD) software or the like, is transformed into a plurality of thin (quasi-two-dimensional) cross-sectional layers which are built on one another in succession.

In some circumstances, it may be desirable to replace the interior of a virtual solid three-dimensional model (e.g. a CAD model, in any of a number of possible formats) with a void or an internal framework. A model with an internal void may resemble a shell of the original model. An internal framework may comprise an array of support struts or a microstructure such as an open-celled foam or the like. There are a number of reasons for replacing the solid interior of an original model. One reason may be to use less material in the creation of a physical model (e.g. by a three-dimensional printer). Another reason may be to create a lighter model whilst maintaining appropriate stiffness or rigidity. A further reason may be to enhance the model's physical properties in some way, e.g. to prevent warping or the like. For example, an internal microstructure may give an object different electromagnetic properties, which may be of interest in the field of radar technology.

The conventional approach to hollowing out a solid CAD object starts with a CAD representation of the object, which is a collection of vector-based representations of graphical entities corresponding to the different outer surfaces of the object. To achieve hollowing out, the conventional approach moves the outer surfaces inwards by a fixed amount (typically specified by the user). The set of surfaces spawned by this movement are designated as internal surfaces, whereby the original (external) and spawned (internal) surfaces are used to define the exterior and interior of the hollowed out model. This process is sometimes called shelling or offsetting.

Difficulties can arise with this conventional approach because displacing outer surfaces inwards can cause the formation of new intersections or result in surfaces not meeting at edges. It is possible to handle these difficulties for relatively simple objects, although inconvenient if it must be done manually. However, for more complex objects, such as those requiring a microstructure to be formed in the interior of the object, these difficulties present significant problems.

One known attempt to introduce a microstructure into a three-dimensional CAD object involved merging a CAD description of a microstructure with the internal surface(s) of the hollowed out model spawned by the shelling process described above. This technique is difficult and unreliable, e.g. because the intersections between the microstructure and the internal surface(s) of the hollowed out model need to be recomputed in order to create a new closed internal surface. As the complexity in the geometry of the microstructure increases, this process becomes non-trivial and far from robust and often results in undesirable sharp edges where the microstructure and the CAD model interface.

SUMMARY OF THE INVENTION

At its most general, the present invention proposes eroding a digitised (e.g. voxelized) representation of a virtual three-dimensional object (e.g. CAD model) to create the internal volume of the object. After the internal volume is created in this way, a vector-based surface representation (e.g. CAD model, in STL format or the like) thereof can be generated and simply combined with a corresponding vector-based surface representation of the original virtual three-dimensional object to yield a hollowed out model in a format suitable for three-dimensional printing. A microstructure may be introduced into the interior by extracting a volume corresponding to the inverse of that microstructure from the eroded digitised representation and then generating a vector-based surface representation of the interior space from that extracted volume. In practice, this may be achieved by subtracting a digitised representation of a microstructure from the eroded digitised three-dimensional representation of the object, generating a vector-based surface representation of what in effect is the internal spaces of the microstructure, reversing the surface normals of the generated vector-based surface representation so that the outward facing surface(s) thereof becomes inward facing surface(s) and concatenating the result with the original vector-based surface representation of the object.

Obtaining a voxelized three-dimensional representation of a three-dimensional CAD model is a lossy transformation, and as such is a counter-intuitive step for those wishing to obtain an accurate physical model by three-dimensional printing, for whom remaining in CAD form is seen as essential. However, the present invention is built on the unexpected realisation that a switch to a digitised representation to create an interior surface (which can subsequently be converted to a vector-based surface representation) both improves the robustness of the shelling process and provides an efficient mechanism for introducing an internal microstructure. Moreover, because the new surfaces generated from the eroded model and the original CAD surfaces are nested, and therefore do not come into contact, appropriate computer descriptions of the internal surfaces generated can simply be concatenated with the original CAD model to form a new hollowed CAD model.

According a first aspect of the invention, there may be provided a method of preparing a virtual three-dimensional object for three-dimensional printing, the method comprising: obtaining a vector-based surface representation of a virtual three-dimensional object; sampling the volume enclosed by the three-dimensional object to generate a digitised three-dimensional representation of the object; eroding the digitised three-dimensional representation of the object to generate an internal volume; generating a vector-based surface representation of the internal volume, wherein the surfaces of the internal volume represent internal surfaces; and combining the vector-based surface representation of the virtual three-dimensional object with the vector-based surface representation of the internal volume. The method may thus convert the vector-based representation to a digitised, i.e. granular, representation only for the purpose of erosion.

The virtual three-dimensional object may be a computer-aided design (CAD) model (e.g. used in engineering software packages such as AutoCAD and CATIA) or an output from any suitable computer graphics programme. The vector-based surface representation may be in any suitable format, e.g. STL (stereolithography), SAT, IGES, X3D (XML-based) or the like.

The digitised three-dimensional representation of the object may comprise a voxelized model of the virtual three-dimensional object, i.e. effectively a three-dimensional bit-mapped image of a volume enclosing the virtual three-dimensional object. Defining the enclosing volume and performing the sampling steps may be achieved using known techniques. For example, binary sampling on a regular grid may provide a binary bitmapped representation. Alternatively, distance function sampling may be applied to provide a greyscale bitmapped representation in which the distance to the surface of each sample point is encoded using a greyscale value.

Eroding the digitised three-dimensional representation of the object may comprise removing voxels at the surface of the voxelized model in a conventional manner. For example, the erosion may utilise a morphological operator arranged to uniformly remove one or more layers of voxels from the outside surface of a bitmapped representation. Alternatively, the erosion may be refined to a sub-voxel resolution by modifying appropriately the greyscale values of surface voxels.

The removed layer of voxels may have a variable depth around the voxelized model. For example, it may be desirable for the shell to have different thickness. Accordingly the number of voxels removed from the surface of the voxelized model may vary by location. Furthermore, if it is desirable for the shape of the surface of the internal volume to map closely the shape of the outer surface, the sampling rate may be variable within the enclosed volume. For example, the sampling rate may be higher in a boundary region containing the outer surface of the virtual three-dimensional object and lower in the centre of the object. The variable sampling rate may be achieved by morphing the shape of a uniform sampling mesh, as disclosed in GB 2 460 411.

A particular advantage of eroding a digitised representation to obtain an internal volume is the ease at which problems arising from the intersection of inwardly moved surfaces are avoided, because by definition the erosion acts to shrink the object rather than merely displacing its surfaces.

In one embodiment, to ensure the surfaces of the internal volume represent internal surfaces the method may include inverting the digitised representation of the internal volume before generating the vector-based surface representation of the internal volume, whereby the surfaces of the internal volume automatically represent internal surface upon generating the vector-based surface representation of the internal volume.

In another embodiment, instead of inverting the eroded image, the method may include designating an exterior surface defined by the vector-based surface representation of the internal volume as an internal surface before combining it with the vector-based surface representation of the virtual three-dimensional object. Designating an exterior surface defined by the vector-based surface representation of the internal volume as an internal surface may include reversing the direction of a plurality of surface normals associated with the exterior surface.

The method may include applying a microstructure to the internal volume. For example, the method may include performing a union operation to combine a digitised representation of a microstructure with the inverted digitised internal volume, wherein the generated internal volume consists of the microstructure.

Alternatively, the method may include, after eroding the digitised three-dimensional representation of the object, subtracting a digitised representation of a microstructure from the eroded digitised three-dimensional representation of the object, wherein the generated internal volume consists of the microstructure. Herein, subtracting means performing a voxel-by-voxel calculation in which the sampling value (e.g. binary or greyscale value) for each voxel of the digitised representation of a microstructure is subtracted from a corresponding voxel of the eroded digitised three-dimensional representation of the object. The result may be the creation of an inverted version of the microstructure in the generated internal volume.

Subtracting digitised representations in this manner carries less of a processing burden than intersecting vector-based volumes.

The digitised representation of a microstructure may be generated from tri-periodic mathematical functions or by sampling a virtual three-dimensional model of a microstructure, e.g. defined by a vector-based surface representation, or by scanning a real physical object. For example, the primitive (P) surface, the diamond (D) surface and the gyroid (G) surface may be used to represent microstructures. These minimal surfaces may be defined in mathematical functions using x, y and z coordinates. This method may include modifying the tri-periodic mathematical functions to introduce density variations inside the internal volume [1]. Computer-based analysis techniques, e.g. finite element analysis or the like, may be used to optimise the density variations. Auxetic microstructures or microstructures exhibiting a negative Poisson's ratio may be used.

Applying the internal volume (e.g. having a microstructure) to the (solid) interior of the original virtual three-dimensional object may be achieved in a number of ways, depending on the format of that object. In this aspect of the invention, the original object is defined by a vector-based surface representation. A vector-based surface representation of the internal volume may be generated using any of a number of meshing techniques, e.g. the marching cubes approach used in an image processing technique disclosed in U.S. Pat. No. 4,710,876 which allows for reconstruction of smooth surfaces from image data. The vector-based surface representation of the internal volume may thus comprise a triangulated surface representation which effectively defines as its outer surface the "new" inside surface of the object. By designating this outer surface as an internal surface, e.g. by reversing the direction of the surface normals associated with the outer surface, the internal volume can be combined with the original vector-representation to yield a hollow object.

Combining the vector-based surface representations of the virtual three-dimensional object and the internal volume may comprise performing a concatenation operation to unify sets of data corresponding to the original CAD representations of the virtual three-dimensional object and the newly generated internal boundary respectively. The sets of data may be in a format suitable for such an operation, e.g. in STL format. The eroding step ensures that there is no intersecting of surfaces on the original vector-based representation of the object and the vector-based representation of the internal volume, which permits straightforward use of concatenation operation.

In another aspect, the present invention is used in a process for creating a physical model using three-dimensional printing. In this aspect, the steps of the method described above may be followed by: outputting the combined vector-based surface representation to a three-dimensional printer; and operating the three-dimensional printer to create a physical model corresponding to the combined vector-based surface representation. In this context, three-dimensional printer may mean a device for manufacturing a three-dimensional model by depositing a plurality of layers of material one of top of another. Conventional three-dimensional printers, e.g. rapid prototyping machines or the like, may be used.

In this aspect, the method may be executed by a suitably programmed computer in communication with the three-dimensional printer. Accordingly, the invention may include a computer program product comprising a computer-readable storage medium having software instruction stored thereon, the software instructions being executable by a computer to perform the steps of a method as set out above.

In another aspect, the invention may be used for performing computer-based analysis of a hollowed virtual three-dimensional object. According to this aspect, there may be provided a method of preparing a virtual three-dimensional object for computer-based analysis, the method comprising: obtaining a vector-based surface representation of a virtual three-dimensional object; sampling the volume enclosed by the three-dimensional object to generate a digitised three-dimensional representation of the object; eroding the digitised three-dimensional representation of the object to generate an internal volume; combining the digitised three-dimensional representation of the object with digitised three-dimensional representation of the internal volume; and performing computer-based analysis on the combined digitised three-dimensional representation.

This method may provide as its output a digitised representation of a hollowed-out virtual three-dimensional object. The interior of the object may have a microstructure, as disclosed above. However, in this case a vector-based surface representation of the internal volume is not generated to create the final hollowed-out object. Instead, the digitised internal volume is combined with the digitised version of the original virtual three-dimensional object. This combining step may be achieved by subtracting the digitised internal volume from the digitised version of the original virtual three-dimensional object. The output is thus a voxelized representation of the hollowed out object, which can be segmented and analysed using conventional techniques. For example, a suitably segmented representation may be subjected to finite element or finite volume analysis.

In another aspect, the invention may be applied to assist with the analysis of how applying a microstructured interior to virtual three-dimensional object derived from a real (physical) three-dimensional object affects that object's properties. According to this aspect, there may be provided a method of preparing a virtual three-dimensional object for three-dimensional printing, the method comprising: scanning a physical three-dimensional object to obtain a digitised three-dimensional representation of the object; eroding the digitised three-dimensional representation of the object to generate an internal volume; subtracting a digitised representation of a microstructure from the eroded digitised three-dimensional representation of the object, wherein the generated internal volume consists of the microstructure; and subtracting the digitised three-dimensional representation of the internal volume from the digitised three-dimensional representation of the object. The representation resulting from this image may be passed on to computer-based analysis tools as mentioned above, or may be passed to a three-dimensional printer for printing.

Alternatively or additionally, a vector-based surface representation of the digitised three-dimensional representation obtained by scanning the object may be generated and combined with a vector-based surface representation of the internal volume, e.g. for use in displaying and/or printing the object.

In another aspect, the invention may provide apparatus for preparing a virtual three-dimensional object for three-dimensional printing, the apparatus comprising: an input device for receiving a vector-based surface representation of a virtual three-dimensional object; a memory arranged to store the vector-based surface representation of a virtual three-dimensional object; a processor programmed to: sample the volume enclosed by the three-dimensional object to generate a digitised three-dimensional representation of the object, erode the digitised three-dimensional representation of the object to generate an internal volume, generate a vector-based surface representation of the internal volume, designate the vector-based surface representation of the internal volume as an internal surface, and combine the vector-based surface representation of the virtual three-dimensional object with the vector-based surface representation of the internal volume; and an output device for outputting the combined vector-based surface representation of the object and internal volume.

The input device may be a user-operated device, such as a mouse, keyboard or touch screen, or a device for receiving other types of data, e.g. electrical signals or binary code, such as an antenna, disk drive or the like. The output device may be any type of suitable communication apparatus for transmitting data representative of the combined vector-based surface representation of the object and internal volume, e.g. a wireless transmitter, wired link or the like.

The output device may be connected to a display and/or a three-dimensional printer equipped to receive and process the data transmitted by the output device.

The memory may store thereon a library comprising a plurality of digitised representations of microstructures, wherein the processor is further programmed to: permit selection via the input device of a microstructure in the library; and intersect the eroded digitised three-dimensional representation of the object with a digitised representation of the selected microstructure, wherein the generated internal volume consists of the microstructure.

BRIEF DESCRIPTION OF THE DRAWINGS

An example of the invention is described below with reference to the accompanying drawings, in which.

DETAILED DESCRIPTION OF CERTAIN EMBODIMENTS, OPTIONS AND PREFERENCES

Figure 1:
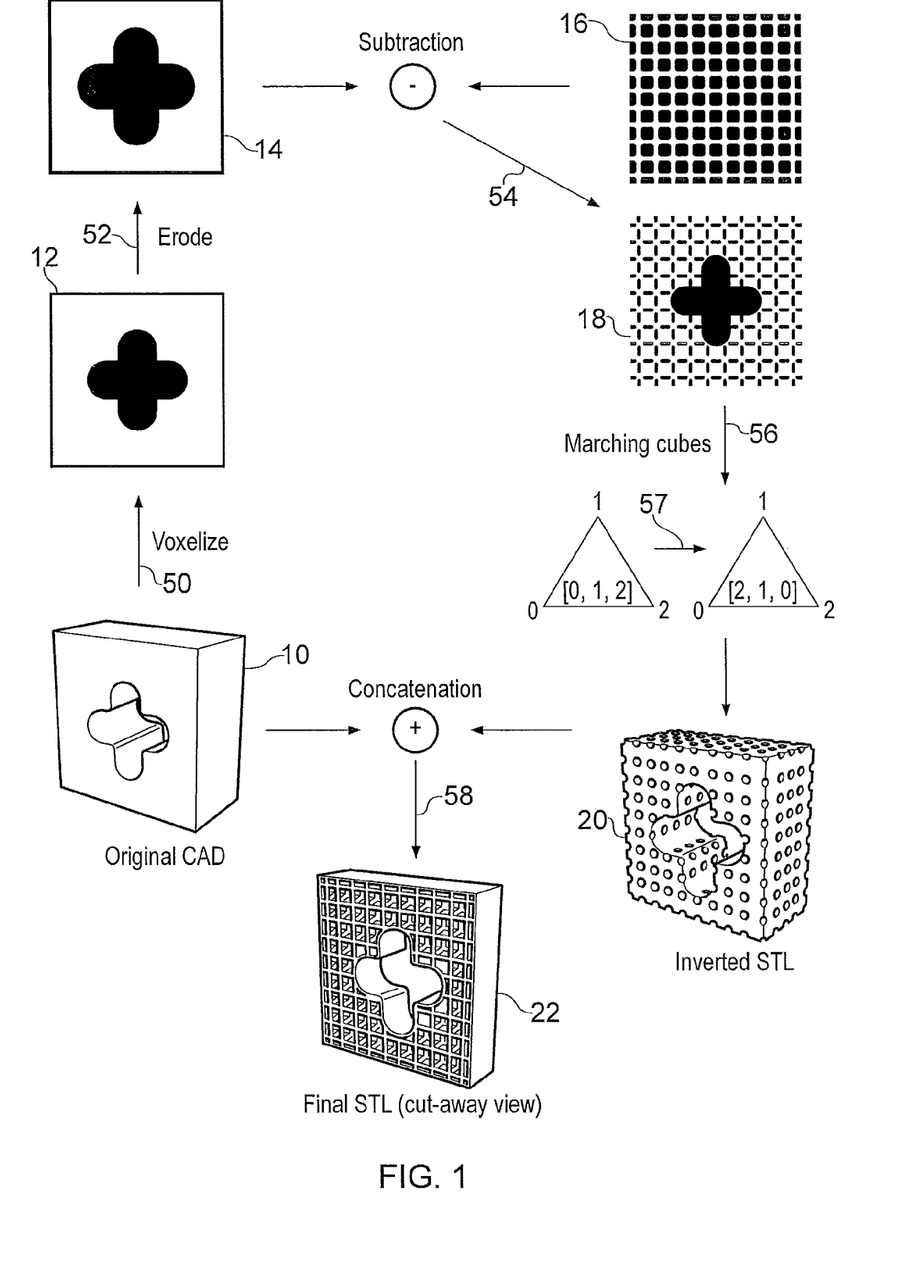
FIG. 1 is a graphical illustration of the steps of a method that is an embodiment of the invention.

FIG. 1 illustrates a method that is an embodiment of the invention. The aim of this embodiment is to introduce into a solid (or filled) model an internal space, which internal space may have a microstructure, e.g. foam or the like.

The method starts from a vector-based representation of a three-dimensional model, which in this example is a perspective view of a cuboidal CAD model 10. A first step 50 in the method comprises converting the CAD model 10 into a three-dimensional image or digital representation 12. This can be carried out by sampling the volume enclosed by the CAD model 10. In effect the model is converted into a three-dimensional bitmapped image, e.g. each bit representing a voxel of the digital representation. For convenience in this example, the voxels in the digital representation 12 are shown as cuboidal, but other suitable shapes may be used.

The conversion of the CAD model 10 into the digital representation 12 is a lossy transformation. Detailed features of the CAD model (e.g. at corners and edges) can be lost in the conversion. Conversion may be performed using a signed distance function rather than a straight binarisation to give a better representation. However, the accuracy of the outer surface of the digital representation 12 is not in fact critical, because it needs to be eroded anyway to fulfil its purpose of constructing a new internal surface for the CAD model 10.

A second step 52 of the method comprises eroding the three-dimensional digital representation 12 by a prescribed amount to create an eroded digital representation 14 (e.g. voxelized image) which is effectively shrunk in size from the original. This eroding step may be carried out using standard image processing techniques in which surface voxels to a depth of one or more are removed from all surfaces. The amount of shrinkage may correspond to one or more times the voxel side length. In a preferred embodiment, the surface voxels of the three-dimensional digital representation 12 possess greyscale values derived during the conversion step 50. In reconstructing the surface the greyscale values of voxels on the surface can be used to determine interpolation points on which interpolated surface will lie. In one embodiment, the erosion step may comprise removing one or more voxel layers and assigning to the outer voxel layer of the shrunken digitised representation the same greyscale value as the original outer layer. Alternatively, the erosion step may comprise removing zero or more voxels from the surface and decreasing the greyscale value of one or more of the voxels in the outer voxel layer of the shrunken digitised representation by a certain (e.g. predetermined or user-selected) percentage which will move the surface by a corresponding proportion of a voxel side length. This may be particularly advantageous where a specific shell thickness is desired which is not an integer multiple of the sampling rate employed in the voxelization. For example, eroding to sub-voxel resolution may enable a 2.5 mm thickness shell to be achieved for a model sampled at 1 mm. which could only otherwise be achieved by resampling the model, e.g. at 0.5 mm.

The sampling rate selected for creating the digitised representation 12 of the original CAD model 10 affects the relative size of voxels in the final image, and can therefore affect the detail with which features on the ultimately created internal surface can be represented. Where a microstructure is to be introduced, it is desirable for the eroded digital representation 14 to have the same resolution as a digitised representation of that microstructure. This may be achieved by selecting a sampling rate for the conversion step 50 that is equal to the sampling rate used to create the digitised representation of the microstructure. However, in practice since it is likely that the microstructure will require a resolution much higher than that which is suitable (or sufficient) for digitising (voxelizing) the original CAD model 10, an alternative approach is to perform the conversion step 50 at a lower sampling rate (resolution) and then resample the digital representation 12 to match the resolution of the digitised representation of the microstructure. This alternative approach may reduce the computational burden of computing the distance function required as part of the conversion step 50.

In this embodiment, the resolution at which the CAD is digitised is determined by multiplying the average side length of the original CAD model's bounding box by a scale factor, which may be preset or selectable by a user, e.g. from a range bounded by preset upper and lower limits.

Where sub-voxel resolution erosion techniques are employed, the shell thickness need not necessarily be a multiple of the sampling rate. For example, a volume with a sampling rate of 1 mm could be effectively eroded by 0.3 mm.

The result of the second step is thus an eroded image 14 that can be used as a three-dimensional representation (e.g. voxelized image) of an internal volume (i.e. region to be hollowed out) of the original CAD model 10.

A third step 54 of the method may comprise modifying the eroded image 14 by merging it with a digitised representation of an appropriate microstructure 16. In this embodiment, the third step 54 comprises subtracting the microstructure 16 from the eroded image 14 to yield a representation that is effectively the digital negative of the microstructure 18 occupying the internal volume, i.e. effectively an inverted microstructure in the internal volume.

A fourth step 56 generates a vector-based surface representation 20 of the inverted microstructure. This step may use any of a number of techniques such as the marching cubes approach. The vector-based surface representation 20 may comprise a triangulated surface, which effectively describes the new surfaces/boundaries of the interior volume to be introduced to the original CAD model 10. The vector-based surface representation 20 (shown graphically in FIG. 1) may be in the STL format.

In a fifth step 57, the outward facing surface of the vector-based surface representation 20 is designated as an inward facing surface. This may be achieved by flipping the normals of the vector-based surface representation 20, which also has the effect of reversing the void/solid volumes, and hence introducing the microstructure. Where the marching cubes approach is used, the surface normal direction is defined by the order in which the triangle's vertices are specified; the direction is flipped by reversing this order for each triangle.

In a sixth step 58, the vector-based surface representation 20 of the interior surface is merged/re-integrated with the original exterior surface representation of the CAD model 10 to form robustly a hollowed out (shelled) model 22 of prescribed thickness having a microstructured interior. FIG. 1 shows a cut-away view of the hollowed out model 22, where the internal microstructure obtained by concatenating the inverted vector-based surface representation 20 with the original CAD model 10.

Figure 2:
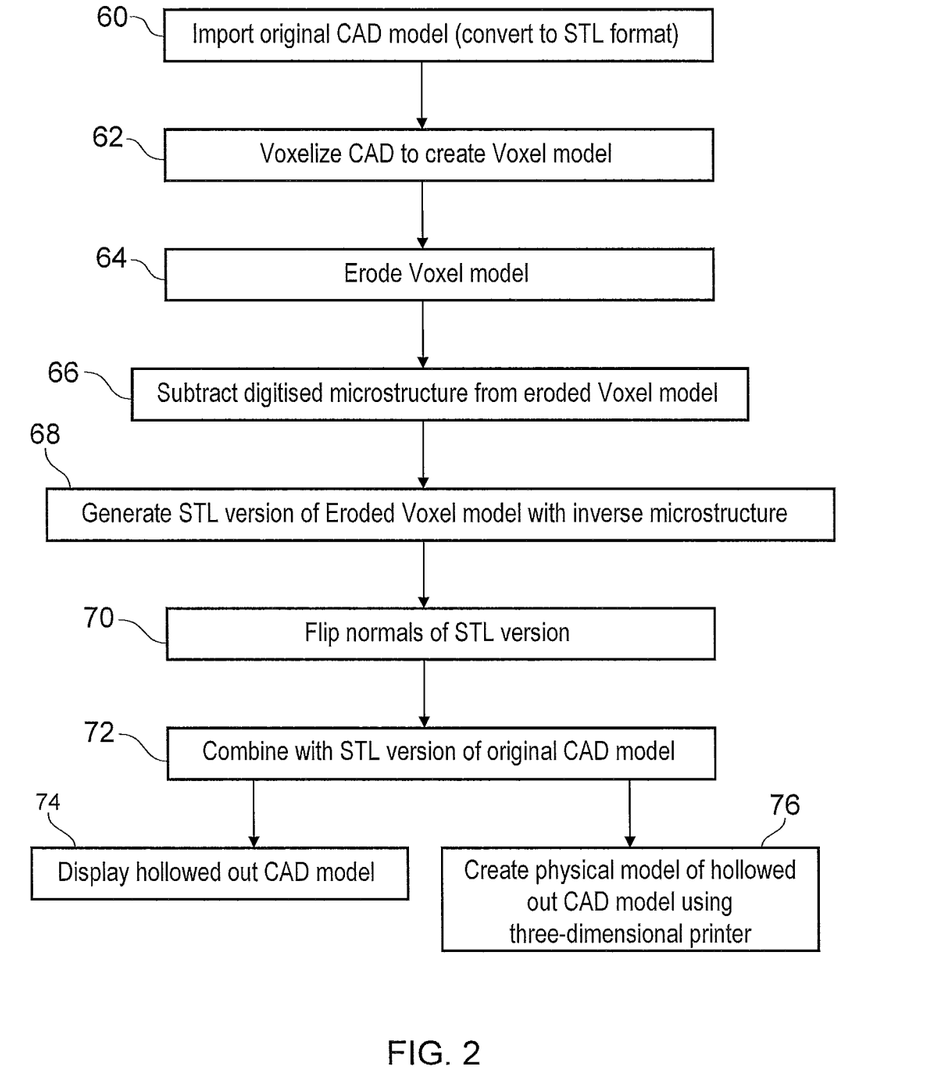
FIG. 2 is a flow diagram of the steps of a method that is an embodiment of the invention.

FIG. 2 is a flow chart summarising the steps of another method that is an embodiment of the invention. The method is similar to that described above, for creating a hollowed out version of an original CAD model. In this embodiment, the hollowed out CAD model is displayed and/or used by a three-dimensional printer to make a physical model.

The method comprises a first step 60 of importing an original three-dimensional CAD model. The step of importing may act to convert the CAD model into STL format. In a second step 62, the CAD model is voxelized to create a digitised (e.g. bitmapped) representation thereof, which may be referred to as a voxel model. This step may correspond to the first step 50 described above.

In a third step 64, the voxel model is eroded by removing n voxels (or parts of voxels with greyscale erosion) from each point on it surface. This step may correspond to the second step 52 described above.

In a fourth step 66, a digitised representation of a microstructure is subtracted from the eroded voxel model to create of the volume to be removed from the interior of the original CAD model. This step may correspond to the third step 54 described above.

In a fifth step 68, a vector-based surface representation (in STL format) of the intersected eroded voxel model is generated, e.g. using a conventional marching cubes technique. This step may correspond to the fourth step 56 described above.

In a sixth step 70, the surface normals of the STL version of the intersected eroded voxel model are flipped such that its external surfaces are defined as internal surfaces. This step may correspond to the fifth step 57 described above.

In a seventh step 72, the intersected eroded voxel model with flipped surface normal is combined with the STL version of the original CAD model to create the hollowed out model.

This step may correspond to the sixth step 58 described above. The combining may comprise a Boolean operation to unify the STL data sets. Since the internal volume was created from an eroded version of the original CAD model, there will be no intersecting surfaces, which simplifies processing.

The combined STL version of the hollowed out model may be output for external use. For example, in step 74 the combined STL version of the hollowed out model may be processing by a conventional graphics program and displayed, e.g. on a monitor or the like. Alternatively or additionally, the combined STL version of the hollowed out model may be outputted to a three-dimensional printer, which may be capable of deriving quasi-two-dimensional slices thereof to create a physical model corresponding to the hollowed out model by sequentially depositing layers of material corresponding to the derived slices.

Figure 3:
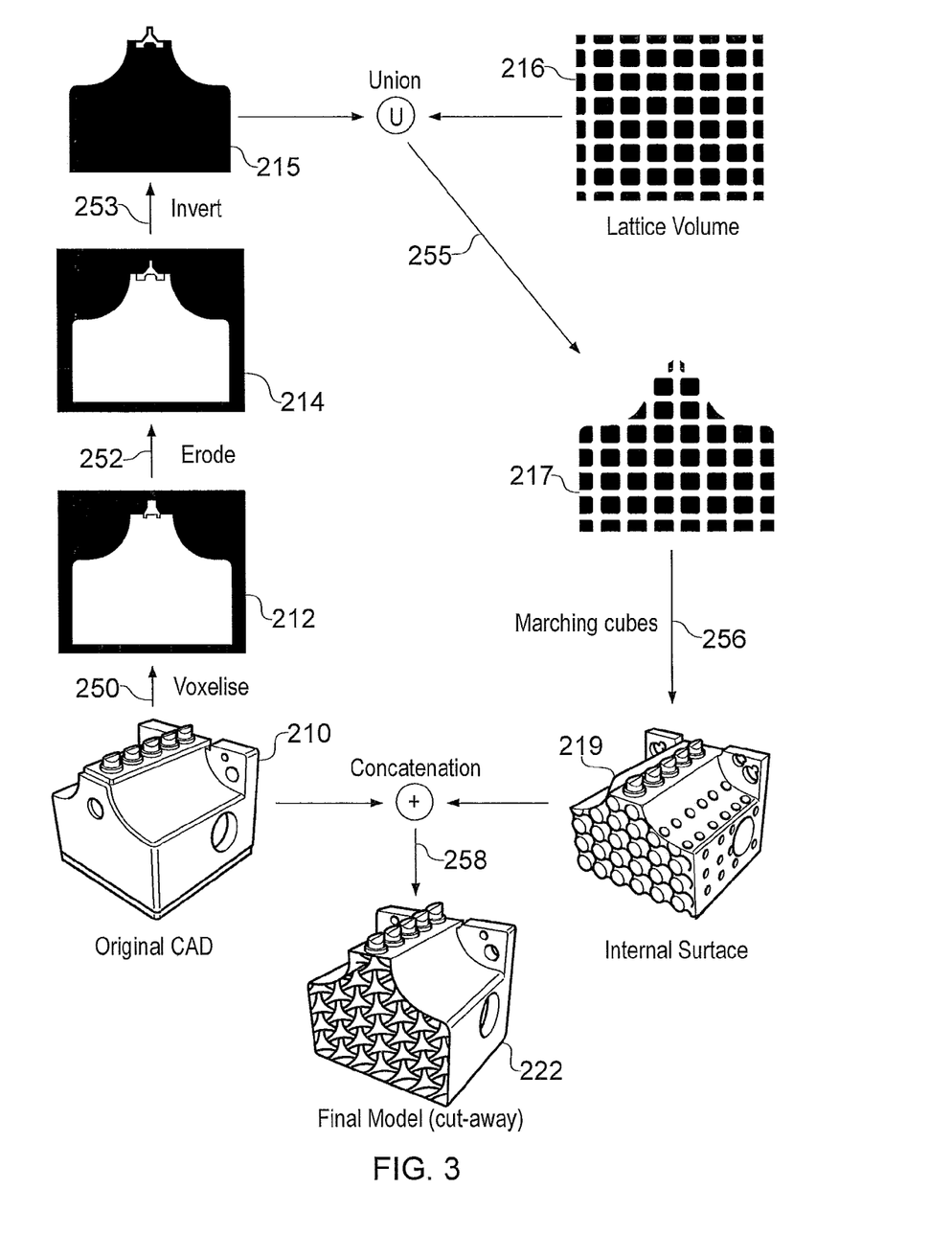
FIG. 3 is a graphical illustration of the steps of a method that is another embodiment of the invention.

FIG. 3 illustrates a method that is another embodiment of the invention. This embodiment is similar to the method described in FIG. 1, but avoids the step of flipping the normals of the vector-based surface representation of the eroded voxel model by inverting the digitised eroded voxel model.

Similarly to the method discussed with reference to FIG. 1, the method of this embodiment starts from a vector-based representation of a three-dimensional model, which in this example is a perspective view of a CAD model 210. A first step 250 in the method comprises converting the CAD model 210 into a three-dimensional image or digital representation 212. This can be carried out by sampling the volume enclosed by the CAD model 210, as discussed above.

A second step 252 of the method comprises eroding the three-dimensional digital representation 212 by a prescribed amount to create an eroded digital representation 214 (e.g. voxelized image) which is effectively shrunk in size from the original. This eroding step may be carried out using standard image processing techniques discussed above.

A third step 253 of the method comprises inverting the eroded image 214 to generate an inverted eroded model 215, e.g. by flipping the bit values or performing a suitable greyscale inversion. The inverted eroded model 215 constitutes a void in a solid universe.

A fourth step 255 of the method may comprises modifying the inverted eroded model 215 by merging it with a digitised representation of an appropriate microstructure 216 (represented in FIG. 3 as a lattice volume). In this embodiment, the fourth step 255 comprises performing a union function to add the microstructure 216 to the inverted eroded model 215 to yield a representation 217 that is effectively a small volume of microstructure within a solid space.

A fifth step 256 generates a vector-based surface representation 219 of the inverted eroded model with microstructure 217, e.g. using any of the techniques contemplated above.

In a sixth step 258, the vector-based surface representation 219 of the inverted eroded model with microstructure is merged/re-integrated with the original exterior surface representation of the CAD model 210 to form robustly a hollowed out (shelled) model 222 of prescribed thickness having a microstructured interior. Similarly to FIG. 1, FIG. 3 shows a cut-away view of the hollowed out model 222, which shows the internal microstructure obtained by concatenating the vector-based surface representation 219 of the inverted eroded model with microstructure with the original CAD model 210.

Figure 4:
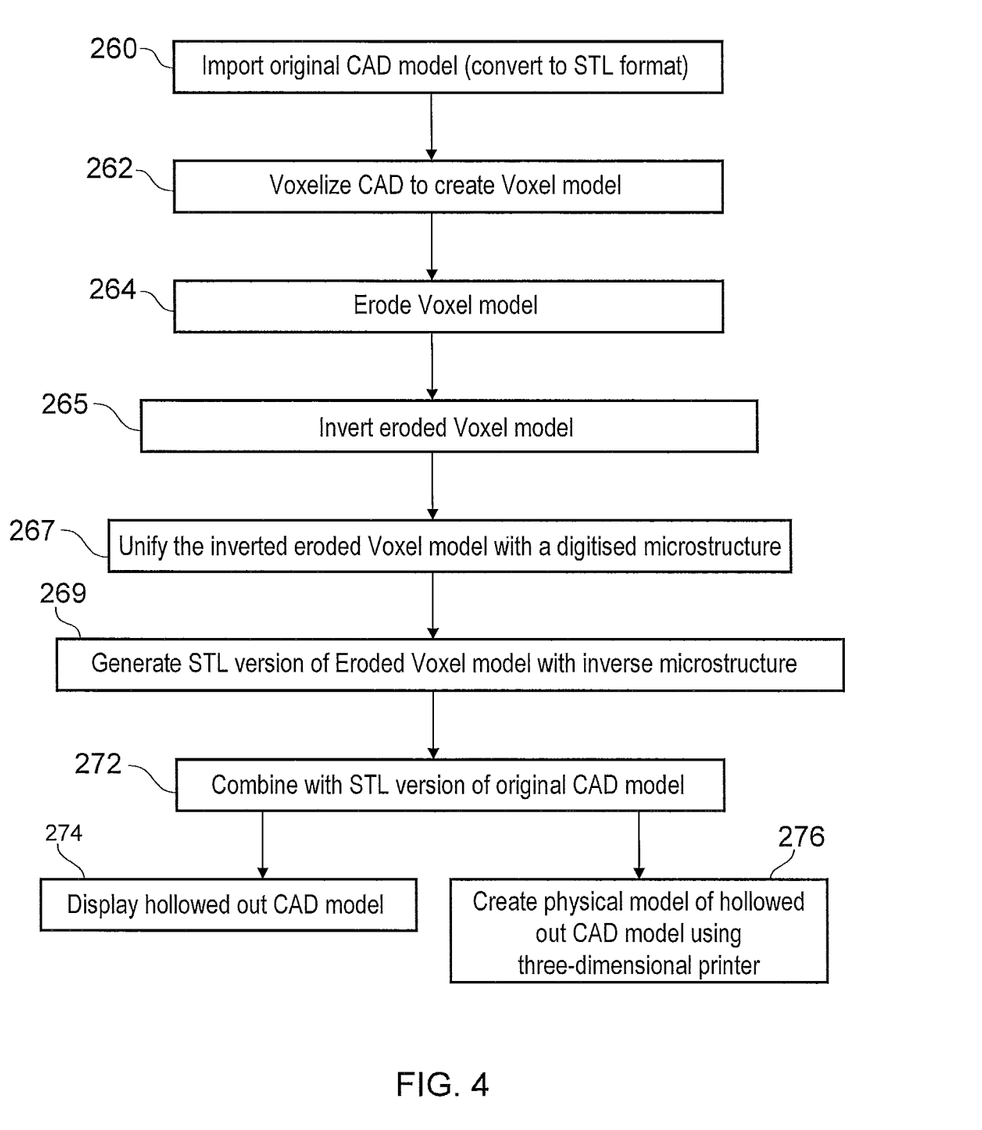
FIG. 4 is a flow diagram of the steps of a method that is another embodiment of the invention.

FIG. 4 is a flow chart summarising the steps of a method that is another embodiment of the invention. The method is similar to the method described above with reference to FIG. 3, for creating a hollowed out version of an original CAD model. In this embodiment, the hollowed out CAD model is displayed and/or used by a three-dimensional printer to make a physical model.

The method comprises a first step 260 of importing an original three-dimensional CAD model, a second step 262 of voxelizing the CAD model to create a digitised (e.g. bit-mapped) representation thereof, which may be referred to as a voxel model, and a third step 264 of eroding the voxel model by removing n voxels (or parts of voxels with greyscale erosion) from each point on it surface. These steps may correspond to the first step 60, second step 62 and third step 64 of FIG. 2.

In a fourth step 265, the eroded voxel model is inverted, i.e. all the voxel bits values are inverted. This step can be envisaged as swapping a solid representation of the eroded model in space for a solid space in which eroded model appears as a isolated hollow. The purpose of this inversion is that the inverted eroded model is perceived as an inner surface of the solid space rather than an outer surface of a solid volume.

In a fifth step 267, a digitised representation of a microstructure is combined with the inverted eroded voxel model (e.g. using a union function). This step causes the microstructure to appear within the isolated hollow that is the inverted eroded model.

In a sixth step 269, a vector-based surface representation (in STL format) of the inverted eroded voxel model with microstructure is generated, e.g. using a conventional marching cubes technique. This step effectively defines the surfaces of the inverted eroded model as internal surfaces of the solid space.

In a seventh step 272, the STL format surface representation generated in the sixth step is simply combined (e.g. concatenated) with the STL version of the original CAD model to create the hollowed out model, which may be displayed (step 274) or output to a three-dimensional printer (step 276). These steps may correspond to steps 72, 74 and 76 of FIG. 2.

Figure 5:
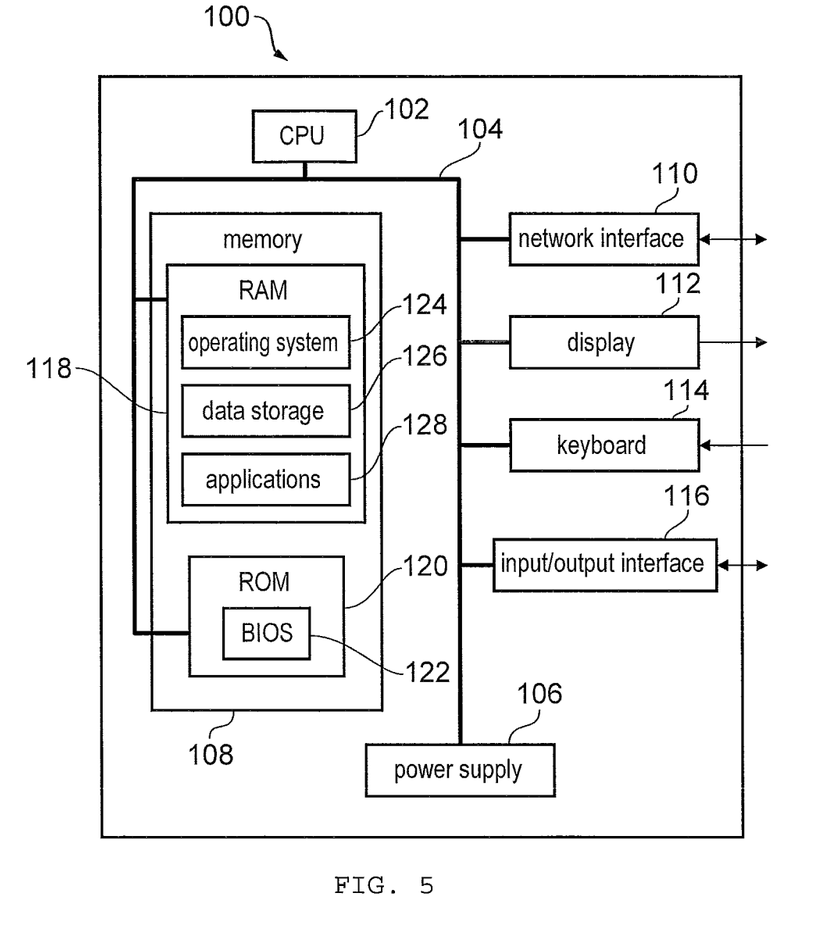
FIG. 5 is a schematic diagram of a processing environment suitable for executing one or more steps of a method according to the invention.

FIG. 5 shows a processing environment 100, e.g. a personal computer or the like, that can be used to implement steps of the invention.

The processing environment 100 includes a processing unit (CPU) 102 in communication with a memory 108 via a data communication bus 104. The processing environment 100 includes a power supply 106, which may be mains power or a portable source of energy, e.g. a rechargeable or non-rechargeable battery. The processing environment 100 also includes one or more network interfaces 110, a display 112, and a keyboard 114 and input/output interface 116 which may function as a user input unit.

The network interface 110 is arranged to connect the processing environment 100 to one or more networks, and may be constructed for use with any suitable communication protocol. The display 112 may be a liquid crystal display (LCD) or any other type of display that can be used with a computing device. The display 112 may also form part of the user input unit by comprising a touch sensitive screen.

The input/output interface 116 can be arranged to communicate with other external devices using any suitable communication technology.

The memory 108 in the processing environment 100 may comprise a RAM 118 and a ROM 120. The memory 108 is arranged to store information such as computer executable instructions, data structures and the like. The ROM 120 may store a basic input/output (BIOS) 122 for controlling low-level operation of the processing environment 100. The RAM 118 may store an operating system 124 for controlling the general operation of the processing environment 100. Conventional computer operating systems may be used.

The RAM 118 may also store applications 128 which run on the operating system. One such application may be the image processing method discussed above. The RAM 118 may also include a general data storage region 126 which is arranged to store information for use with the applications 128.

In one embodiment, the invention may provide a computer program product comprising a computer-readable storage medium having software instructions stored thereon, the software instructions being executable in the processing environment 100 to carry out one or more steps of the invention set out above. The software instructions may be stored in the memory 108, e.g. as an application in the RAM 118. The original CAD model may be imported from a remote network via the network interface 110 or may be input directly by a user using the keyboard 114 and/or other input devices (e.g. a mouse or the like). The result of the method may be displayed on the display 112 or output to a three-dimensional printer either via the network (through network interface 110) or through a suitably configured output port (e.g. part of the input/output interface 116).

Figure 6:
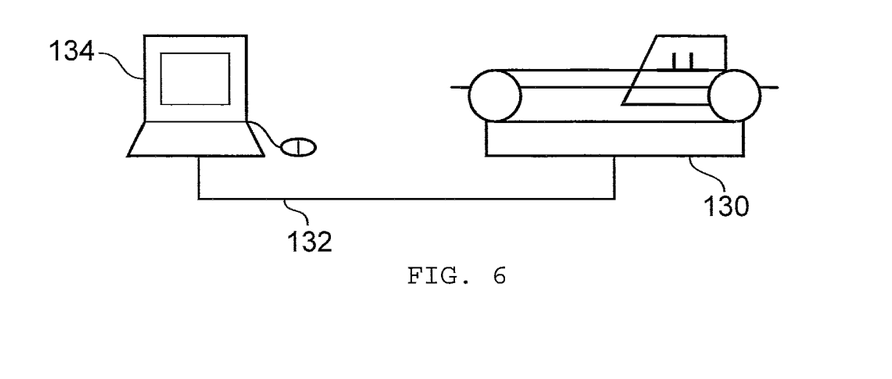
FIG. 6 is schematic diagram of an apparatus that is an embodiment of the invention.

FIG. 6 shows a schematic representation of an apparatus suitable for implementing the invention. The apparatus comprises a three-dimensional printer 130 in communication via a link 132 to a computer 134. The link 132 may be wired or wireless, and may be direct or via a network and/or the Internet. The computer is suitable programmed to perform the method steps described above and forward data representative of the hollowed out model to the three-dimensional printer for printing.

The embodiments above relate to examples where the original model has a vector-based surface representation. In other examples, the original model may already be in a digitised format. For example, the original model may be obtained by scanning a real (physical) model using any of a wide range of 3d imaging modalities such as MRI (Magnetic Resonance Imaging), CT (Computed Tomography) and Ultrasound. In this case, the hollowed out model may be obtained by removing the digitised internal volume from the original digitised model. If a vector-based surface representation (e.g. in STL format) in required for subsequent processing, the marching cubes technique may be used to generate it from the digitised hollowed out model.

Alternatively or additionally, the hollowed out digitised model may be used to perform computer-based analysis. For example, it may be segmented using conventional techniques and exported to a finite element analysis package, such as +ScanFE manufactured by Simpleware Limited.

The microstructure in the internal may be adapted to act as a support structure, e.g. a internal structure having a plurality of support elements extending across the internal is volume to provide structural rigidity in one or more directions. For example, the microstructure may be biased in one direction (e.g. the direction of principal loading) to provide support.

REFERENCE

[1] Gabbrielli, R., Turner, I. G., and Bowen, C. R.: Development of Modelling Methods for Materials to be Used as Bone Substitutes, Key Engineering Materials 361-363, volume 361-363, 903-906, 2008

The invention claimed is:

1. A method of preparing a virtual three-dimensional object for three-dimensional printing, the method comprising:
    obtaining a vector-based surface representation of the virtual three-dimensional object, wherein the vector-based surface representation comprises surfaces of the virtual three-dimensional object enclosing a volume;
    sampling the volume enclosed by the vector-based surface representation of the virtual three-dimensional object to generate a digitised three-dimensional representation of the virtual three-dimensional object;
    eroding the digitised three-dimensional representation of the virtual three-dimensional object to generate a digitised representation of an internal volume of the virtual three-dimensional object;
    generating a vector-based surface representation of the internal volume using the digitized representation of the internal volume of the virtual three-dimensional object, wherein the surfaces of the internal volume represent internal surfaces of the virtual three-dimensional object;
    combining the vector-based surface representation of the virtual three-dimensional object with the vector-based surface representation of the internal volume of the virtual three-dimensional object; and
    outputting the combined vector-based surface representation using an output device.

2. A method according to claim 1 including inverting the digitised representation of the internal volume before generating the vector-based surface representation of the internal volume, whereby the surfaces of the internal volume automatically represent internal surface upon generating the vector-based surface representation of the internal volume.

3. A method according to claim 2 including performing a union operation to combine a digitised representation of a microstructure with the inverted digitised representation of the internal volume, wherein the combined digitised representation of the internal volume consists of the microstructure.

4. A method according to claim 1 including designating an exterior surface defined by the vector-based surface representation of the internal volume as an internal surface before combining it with the vector-based surface representation of the virtual three-dimensional object.

5. A method according to claim 4, wherein designating an exterior surface defined by the vector-based surface representation of the internal volume as an internal surface includes reversing the direction of a plurality of surface normals associated with the exterior surface.

6. A method according to claim 4 including, after eroding the digitised three-dimensional representation of the virtual three-dimensional object to generate a digitised representation of the internal volume of the virtual three-dimensional object, subtracting a digitised representation of a microstructure from the digitised representation of the internal volume, wherein the generated digitised representation of the internal volume consists of the microstructure.

7. A method according to claim 1 including applying a microstructure to the digitised representation of the internal volume.

8. A method according to claim 7, wherein a digitised representation of the microstructure is generated from tri-periodic mathematical functions.

9. A method according to claim 8 including modifying the tri-periodic mathematical functions to introduce density variations inside the internal volume.

10. A method according to claim 7, wherein a digitised representation of the microstructure is generated by sampling a virtual three-dimensional vector-based model of a microstructure or by scanning a real physical object.

11. A method according to claim 1, wherein the digitised three-dimensional representation of the virtual three-dimensional object comprises a voxelized model of the virtual three-dimensional object, and wherein eroding the digitised three-dimensional representation of the virtual three-dimensional object comprises removing voxels at the surface of the voxelized model.

12. A method according to claim 11, wherein eroding the digitised three-dimensional representation of the virtual three-dimensional object comprises removing a layer of voxels from the whole surface of the voxelized model.

13. A method according to claim 12, wherein the removed layer of voxels has a variable depth.

14. A method according to claim 13, including determining the variable depth by way of single or multiple computer-based analysis.

15. A method according to claim 1, wherein combining the vector-based surface representations of the virtual three-dimensional object and the internal volume comprising performing a concatenation operation to unify sets of data corresponding to the vector-based surface representations of the original virtual three-dimensional object and the internal volume respectively.

16. A method according to claim 15, wherein the sets of data are in STL format.

17. A computer program product comprising a computer-readable storage medium having software instructions stored thereon, the software instructions being executable by a computer to perform the steps of a method according to claim comprising:
obtaining a vector-based surface representation of a virtual three-dimensional object, wherein the vector-based surface representation comprises surfaces of the virtual three-dimensional object enclosing a volume;
sampling the volume enclosed by the vector-based surface representation of the virtual three-dimensional object to generate a digitised three-dimensional representation of the virtual three-dimensional object;
eroding the digitised three-dimensional representation of the virtual three-dimensional object to generate a digitised representation of an internal volume of the virtual three-dimensional object;
generating a vector-based surface representation of the internal volume using the digitized representation of the internal volume of the virtual three-dimensional object, wherein the surfaces of the internal volume represent internal surfaces of the virtual three-dimensional object;
combining the vector-based surface representation of the virtual three-dimensional object with the vector-based surface representation of the internal volume of the virtual three-dimensional object; and
outputting the combined vector-based surface representation using an output device.

18. A method of generating a physical model using three-dimensional printing, the method comprising:
inputting a vector-based surface representation of a virtual three-dimensional object, wherein the vector-based surface representation comprises surfaces of the virtual three-dimensional object enclosing a volume;
sampling the volume enclosed by the vector-based surface representation of the virtual three-dimensional object to generate a digitised three-dimensional representation of the virtual three-dimensional object;
eroding the digitised three-dimensional representation of the virtual three-dimensional object to generate an internal volume of the virtual three-dimensional object;
generating a vector-based surface representation of the internal volume using the digitised representation of the internal volume of the virtual three-dimensional object, wherein the surfaces of the internal volume represent internal surfaces of the virtual three-dimensional object; and
combining the vector-based surface representation of the virtual three-dimensional object with the vector-based surface representation of the internal volume of the virtual three-dimensional object;
outputting the combined vector-based surface representation to a three-dimensional printer; and
operating the three-dimensional printer to create a physical model corresponding to the combined vector-based surface representation.

19. A method of preparing a virtual three-dimensional object for computer-based analysis, the method comprising:
obtaining a vector-based surface representation of the virtual three-dimensional object, wherein the vector-based surface representation comprises surfaces of the virtual three-dimensional object enclosing a volume;
sampling the volume enclosed by the vector-based surface representation of the virtual three-dimensional object to generate a digitised three-dimensional representation of the virtual three-dimensional object;
eroding the digitised three-dimensional representation of the virtual three-dimensional object to generate a digitised representation of an internal volume of the virtual three-dimensional object;
combining the digitised three-dimensional representation of the virtual three-dimensional object with digitised three-dimensional representation of the internal volume; and
performing computer-based analysis on the combined digitised three-dimensional representation.

20. A method according to claim 19 including, after eroding the digitised three-dimensional representation of the virtual three-dimensional object, subtracting a digitised representation of a microstructure from the eroded digitised three-dimensional representation of the virtual three-dimensional object, wherein the generated internal volume consists of the microstructure.

21. A method according to claim 19 including, after eroding the digitised three-dimensional representation of the virtual three-dimensional object, inverting the digitised representation of the internal volume and performing a union operation to combine a digitised representation of a microstructure with the inverted digitised internal volume, wherein the generated internal volume consists of the microstructure.

22. A method according to claim 19, wherein the computer-based analysis includes finite element and/or finite volume analysis.

23. A method of preparing a virtual three-dimensional object for three-dimensional printing, the method comprising:
scanning a physical three-dimensional object to obtain a digitised three-dimensional representation of the physical three-dimensional object;
eroding the digitised three-dimensional representation of the physical three-dimensional object to generate a digitised representation of an internal volume of the physical three-dimensional object;
subtracting a digitised representation of a microstructure from the digitised representation of the internal volume of the physical three-dimensional object, wherein the generated digitised representation of the internal volume consists of an inverted version of the microstructure; and
subtracting the generated digitised representation of the internal volume from the digitised three-dimensional representation of the physical three-dimensional object to create a hollowed out representation of the physical three-dimensional object.

24. A method according to claim 23 including generating a vector-based surface representation of the hollowed-out representation of the physical three-dimensional object.

25. A method of preparing a virtual three-dimensional object for three-dimensional printing, the method comprising:
scanning a physical three-dimensional object to obtain a digitised three-dimensional representation of the physical three-dimensional object;
eroding the digitised three-dimensional representation of the physical three-dimensional object to generate a digitised representation of an internal volume of the physical three-dimensional object;
inverting the digitised representation of the internal volume of the physical three-dimensional object;
performing a union operation to combine a digitised representation of a microstructure with the inverted digitised representation of the internal volume of the physical three-dimensional object, wherein the generated digitised representation of the internal volume consists of the microstructure; and
combining the digitised three-dimensional representation of the physical three-dimensional object with digitised representation of the internal volume to create a hollowed out representation of the physical three-dimensional object.

26. Apparatus for preparing a virtual three-dimensional object for three-dimensional printing, the apparatus comprising:
an input device for receiving a vector-based surface representation of the virtual three-dimensional object, wherein the vector-based surface representation comprises surfaces of the virtual three-dimensional object enclosing a volume;
a memory arranged to store the vector-based surface representation of the virtual three-dimensional object;
a processor programmed to:
sample the volume enclosed by the vector-based surface representation of the virtual three-dimensional object to generate a digitised three-dimensional representation of the virtual three-dimensional object,
erode the digitised three-dimensional representation of the virtual three-dimensional object to generate a digitised representation of an internal volume of the virtual three-dimensional object,
generate a vector-based surface representation of the internal volume using the digitised representation of the internal volume of the virtual three-dimensional object, wherein the surfaces of the internal volume represent internal surfaces of the virtual three-dimensional object, and
combine the vector-based surface representation of the virtual three-dimensional object with the vector-based surface representation of the internal volume of the virtual three-dimensional object; and
an output device for outputting the combined vector-based surface representation of the virtual three-dimensional object and internal volume.

27. Apparatus according to claim 26 including a display and/or a three-dimensional printer connected to the output device.

28. Apparatus according to claim 26, wherein the memory has a library comprising a plurality of digitised representations of microstructures stored thereon, and the processor is further programmed to:
permit selection via the input device of a microstructure in the library; and
apply the digitised representation of the selected microstructure to the digitised representation of the internal volume of the virtual three-dimensional object,
wherein the generated digitised representation of the internal volume consists of the microstructure.

* * * * *